(12) United States Patent
Klish, II

(10) Patent No.: US 6,895,018 B1
(45) Date of Patent: May 17, 2005

(54) METHOD AND SYSTEM FOR IMPROVED SONET DATA COMMUNICATIONS CHANNEL

(75) Inventor: Cypryan T. Klish, II, Raleigh, NC (US)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/359,075

(22) Filed: Jul. 22, 1999

Related U.S. Application Data

(60) Provisional application No. 60/094,415, filed on Jul. 28, 1998.

(51) Int. Cl.[7] .................................................. H04J 3/16
(52) U.S. Cl. .................... 370/471; 370/395.51; 370/474
(58) Field of Search ................................ 370/532, 539, 370/400, 403, 404, 408, 452, 465, 395.51, 395.53, 474, 475, 476, 470, 471, 541

(56) References Cited

U.S. PATENT DOCUMENTS

| | | | | |
|---|---|---|---|---|
| 5,313,453 A | * | 5/1994 | Uchida et al. .............. 370/248 |
| 5,412,651 A | | 5/1995 | Gorshe | |
| 5,537,393 A | * | 7/1996 | Shioda et al. ............... 359/119 |
| 5,574,717 A | * | 11/1996 | Tomizawa et al. .......... 370/244 |
| 5,712,845 A | * | 1/1998 | Peltomaki ................... 370/226 |
| 5,781,527 A | | 7/1998 | Read et al. | |
| 5,857,092 A | * | 1/1999 | Nakamura et al. .......... 370/466 |
| 5,905,585 A | * | 5/1999 | Shirai ......................... 359/110 |
| 5,930,273 A | * | 7/1999 | Mukojima ................... 714/776 |
| 5,978,377 A | * | 11/1999 | Kim et al. .............. 370/395.71 |
| 5,995,627 A | * | 11/1999 | Suh .............................. 380/28 |
| 6,011,802 A | * | 1/2000 | Norman ...................... 370/466 |
| 6,078,596 A | * | 6/2000 | Wellbrock .................. 370/352 |
| 6,122,281 A | * | 9/2000 | Donovan et al. ........... 370/401 |
| 6,169,754 B1 | * | 1/2001 | Sugawara et al. .......... 370/498 |
| 6,411,631 B1 | * | 6/2002 | Sugawara et al. .......... 370/465 |

OTHER PUBLICATIONS

Rao, K, et al., "SDH—SONET Interworking," Interworking in Broadband Networks, Heterogeneity and Global Networking, Proceedings of Interworking, Jan. 1, 1993, pp. 290–304.

* cited by examiner

*Primary Examiner*—Dang Ton
*Assistant Examiner*—Phuc Tran
(74) *Attorney, Agent, or Firm*—Finnegan, Henderson, Farabow, Garrett & Dunner, L.L.P.

(57) ABSTRACT

Systems and methods for use in a synchronous network in which the line data communications channel and section data communications channel are combined to provide an increased bandwidth data communication channel. In one aspect of the invention, all of the bytes of the line data communications channel are combined with the bytes of the sections data communications channel to create a single data communications channel. In another aspect, some but not all of the line data communications channel bytes are moved to the sections data communications channel in order to create an increased capacity section data communications channel.

4 Claims, 14 Drawing Sheets

METHOD AND SYSTEM FOR IMPROVED SONET DATA COMMUNICATIONS CHANNEL

CROSS-REFERENCE TO RELATED APPLICATIONS

This application claims the benefit of U.S. Provisional Application No. 60/094,415, filed Jul. 28, 1998, the contents of which are hereby incorporated by reference.

BACKGROUND OF THE INVENTION

The present invention relates generally to the transmission of data in a synchronous optical network, and more particularly, to an overhead structure for a data frame in a synchronous optical network.

A standard known as Synchronous Optical Network (SONET) defines a hierarchy of rates and formats for use in optical communications systems, as well as other systems. The CCITT has adopted a similar standard and named it the Synchronous Digital Hierarchy (SDH). The SONET/SDH standard is expected to provide a worldwide telecommunications infrastructure for transmitting information. The terms SONET and SDH will henceforth be used interchangeably. Although, there are small differences between the two formats, the differences are immaterial for the present invention.

As shown in FIG. 1, there are three layers in the SONET architecture. These layers include a section, a line, and a path. A section concerns communications between two adjacent network elements, referred to as a section terminating equipment (STE) 110-1 through 110-6. Regenerators 140-1 and 140-2 and add-drop multiplexers (ADM) 150-1 and 150-2 are examples of STE 110-3, 110-4, 110-2, and 110-5, respectively.

A line concerns communications between line terminating equipment (LTE) 120-1 through 120-4, such as add-drop multiplexers 150. As shown in FIG. 1, a line includes one or more sections. LTEs 120-1 through 120-4 perform line performance monitoring and automatic protection switching. Regenerators generally are not LTEs, although add-drop multiplexers typically are both an STE and an LTE.

An end-to-end connection is called a path and the equipment on either end that sends or receives a signal is called a path-terminating equipment (PTE). As shown in the FIG. 1, a path includes one or more lines which in turn include one or more sections.

SONET uses a basic transmission rate of STS-1, which provides a data rate of 51.84 Mbps. Higher rate SONET signals are integer multiples of this base rate. For example, an STS-3 has a data rate of 155.52 Mbps, or 3×51.84 Mbps.

The frame format of the STS-1 is shown in FIG. 2. The frame 210 is divided into two protions: transport overhead 220 and a synchronous payload envelope (SPE) 230. The SPE 230 is an 87 column by 9 row matrix, for a total of 783 bytes, and is divided into two parts: the STS path overhead 232 and the payload 234. The transport overhead 220 is divided into section overhead 222 and line overhead 224.

FIG. 3, provides a diagram of the transport overhead for the current SONET frame structure. In the current frame structure, the first three rows of the transport overhead contain the section overhead and the final six rows contain the line overhead.

The following table provides a brief description of the section overhead 222 bytes shown in FIG. 3.

| Byte | Description |
| --- | --- |
| A1 and A2 | Framing Bytes - These bytes indicate the beginning of an STS-1 frame |
| J0/Z0 | Section Trace (J0)/Section Growth(Z0) - In an STS-N frame, this byte is either the section trace byte, if the STS-1 frame is the first STS-1 frame in the STS-N frame, or is the section growth byte, if the STS-1 frame is the second through Nth STS-1 frame in the STS-N frame. This byte was formerly defined as the STS-1 ID (C1) byte. |
| B1 | Section bit interleaved parity code (BIP-8) byte - This is a parity code (even parity) for checking for transmission errors over a section. In an STS-N frame, this byte is defined for only the first STS-1 frame |
| E1 | Section orderwire byte - This byte is used as a local orderwire channel for voice communications between regenerators, hubs, and remoter terminal locations |
| F1 | Section user channel byte - This byte is set aside for the user. It terminates at all STEs within a line. |
| D1, D2, D3 | Section data communications channel (DCC) bytes - These bytes form a 192 kbps message channel providing a message-based channel for operations, administration, maintenance, and provisioning (OAM&P) between STEs. This channel is used from a central location for alarms, control, monitoring, administration and other communications needs. It is available for internally generated, externally generated, or manufacturer-specific messages. |

The following table provides a brief description of the line overhead 224 bytes shown in FIG. 3.

| Byte | Description |
| --- | --- |
| H1, H2 | STS payload pointer - These pointer bytes are used in frame alignment and frequency adjustment. |
| H3 | Pointer action byte - This byte is used for SPE frequency justification. It is used in all STS-1 frames within an STS-N frame to carry an extra SPE byte in the event of a negative pointer adjustment. When it is not used to carry the SPE byte this byte is undefined. |
| B2 | Line bit interleaved parity code byte - This byte is used to determine if a transmission error has occurred over the line. |
| K1, K2 | Automatic protection switching (APS channel) bytes - These bytes are used for protection signalling between LTEs for bi-directional APS and for detecting alarm indication signals (AIS-L) and remote defect indication (RDI) signals. |
| D4–D12 | Line data communications channel bytes (LDCC) - These 9 bytes are used to provide a 576 kbps message channel from a central location for OAM&P information, such as alarms, control, maintenance, remote provisioning, monitoring, administration, and other communications needs, between LTEs. This channel is available for internally generated, externally generated and manufacturer-specific messages. |
| S1 | Synchronization status byte - This byte is located in the first STS-1 frame in an STS-N frame. Bits 5–8 of this byte convey the synchronization status of the network. |
| Z1 | Growth byte - This byte is allocated in the $2^{nd}$ through $N^{th}$ STS-1 frame in an STS-N frame where $3 \leq N \leq 48$, and is allocated for future growth. |
| M0 | STS-1 REI-L byte - This byte is only defined for an STS-1 frame in an OC-1 or STS-1 electrical signal. Bits 5–8 of this byte are allocated for a line remote error indication function (REI-L), formerly referred to as Line FEBE. This function conveys the error count detected by an LTE, using the line BIP-8 code, back to its peer LTE. |
| M1 | STS-N REI-L byte - This byte is located in the third STS-1 frame in an STS-N frame, and is used for REI-L purposes. |
| Z2 | Growth byte - This byte is located in the first and second STS-1 frame of an STS-3 frame and the first, second, and fourth through $N^{th}$ STS-1 frame of an STS-N frame, where $12 \leq N \leq 48$. These bytes are allocated for future growth. |
| E2 | Orderwire byte - This byte provides a 64 kbps channel between LTEs for an express orderwire. It is a voice channel for use by technicians. |

SONET standards have specified a number of management applications whose protocol data units (PDU) are characterized by their large size. These applications include the common management information protocol (CMIP) based Open Systems Interconnection (OSI) management (X.711 or ISO 9596), the file transfer access management (FTAM) based software download and remote back-up applications (ISO 85714), X.500 based directory services, and T1.245 compliant registration management.

Presently, these applications are assigned to the 192 kbps Section Data Communications Channel (SDCC) channel. Because of the large application message size, the total traffic from these applications will exceed the capacity of the SDCC for all but the very simplest SONET networks.

In addition to problems with capacity, there are problems with the current transport overhead structure due to lack of prioritization. Presently, there is no priority mechanism for determining which information can be discarded when the SDCC channel is overloaded. Therefore, in the event the capacity of the SDCC channel is exceeded, information is discarded without any intelligent discrimination. This can result in the loss of vital messages and lead to network failures.

In addition, a number of protocol entities within the OSI seven layer communications stack serving the SDCC conduct peer-to-peer communications over the SDCC, consuming bandwidth that would otherwise be available to management applications. During steady state conditions this protocol traffic is low, however, during abnormal conditions, this traffic can rise to a level that may result in application or protocol traffic being discarded, and thus could lead to network failures.

In addition, the current structure of the transport overhead requires unnecessarily complex SONET interfaces. The current separation of the SONET DCC into SDCC and Line Data Communications Channel (LDCC) requires each SONET interface (that is, both STE and LTE) to terminate an inbound and an outbound SDCC and an inbound and outbound LDCC, for a total of four point to point links per interface. Each of these four links must be brought to a time slot interchange (TSI) for purposes of forwarding or connection to the data link layer of the OSI stack. As such, the TSIs for use with the current overhead structure are unnecessarily complex. FIG. 4 provides an illustration of a TSI 410 of the prior art and shows that TSI 410 receives and transmits information on both the SDCC and LDCC. As such, TSI 410 must drop both the SDCC and LDCC for every interface.

Furthermore, at present the LDCC is under-utilized. This is because, despite its bandwidth being triple that of the SDCC, standards have not assigned any management applications to the LDCC.

SUMMARY OF THE INVENTION

Thus, it is desirable to have a method and system for an improved SONET Data Communications Channel, which overcomes the above and other disadvantages of the prior art.

Methods and systems consistent with the present invention include a frame for carrying information over a communications channel that includes a section overhead and a line overhead. In this aspect, LDCC bytes of the transport overhead are eliminated and added to the SDCC bytes, thus increasing the capacity of the SDCC.

In accordance with one embodiment, such methods and systems comprise a network, including LTEs and STEs. In this aspect, the LTEs and STEs include a framer that inserts a greater number of data communications channel bits into the section overhead than into the line overhead, thus increasing the capacity of the SDCC over the prior art.

In accordance with another embodiment, such methods and systems comprise a network element that inserts a greater number of data communications channel bytes into the section overhead than the line overhead, thus increasing the capacity of the SDCC over the prior art.

In another aspect, the invention comprises a dual mode adapter that includes means for inserting data communications channel bytes into a frame with a higher capacity SDCC, means for inserting data communications channel bytes into a frame according to the prior art, and means for selecting between these two means.

The summary of the invention and the following detailed description should not restrict the scope of the claimed invention. Both provide examples and explanations to enable others to practice the invention. The accompanying drawings, which form part of the description for carrying out the best mode of the invention, show several embodiments of the invention, and together with the description, explain the principles of the invention.

DETAILED DESCRIPTION

Reference will now be made in detail to the preferred embodiments of the invention, examples of which are illustrated in the accompanying drawings. Wherever possible, the same reference numbers will be used throughout the drawings to refer to the same or like parts.

Figure 1:
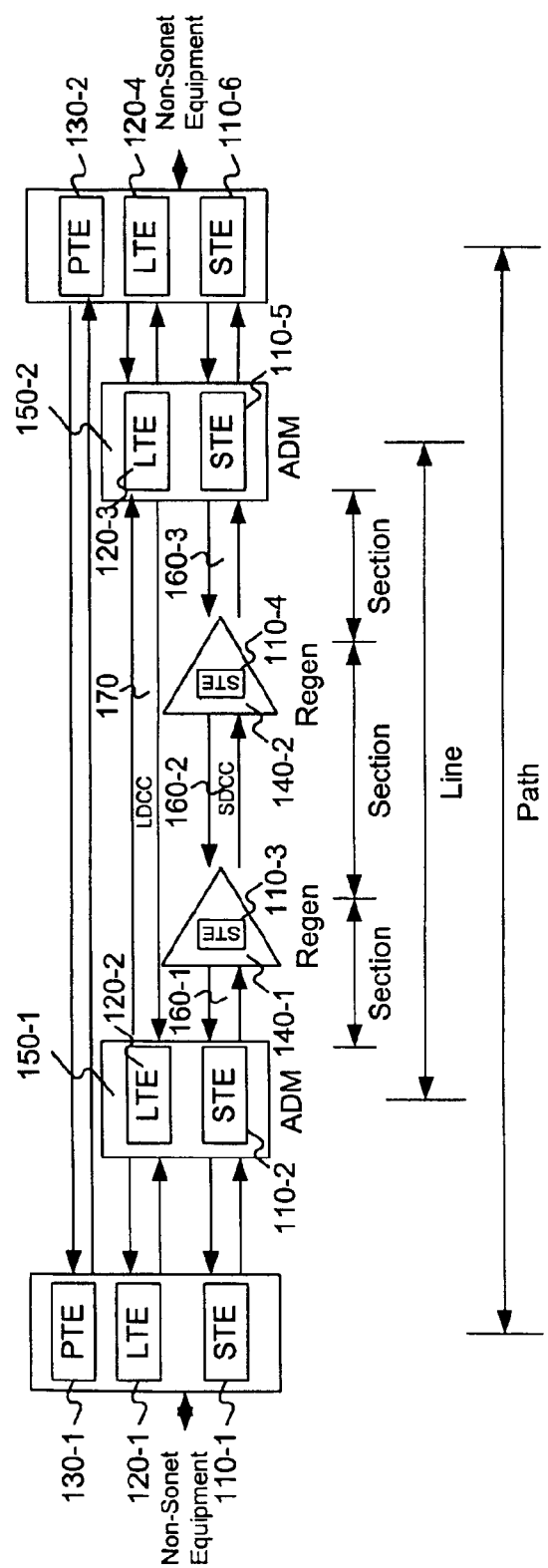
FIG. 1 is an illustration of a SONET architecture.
Figure 2:
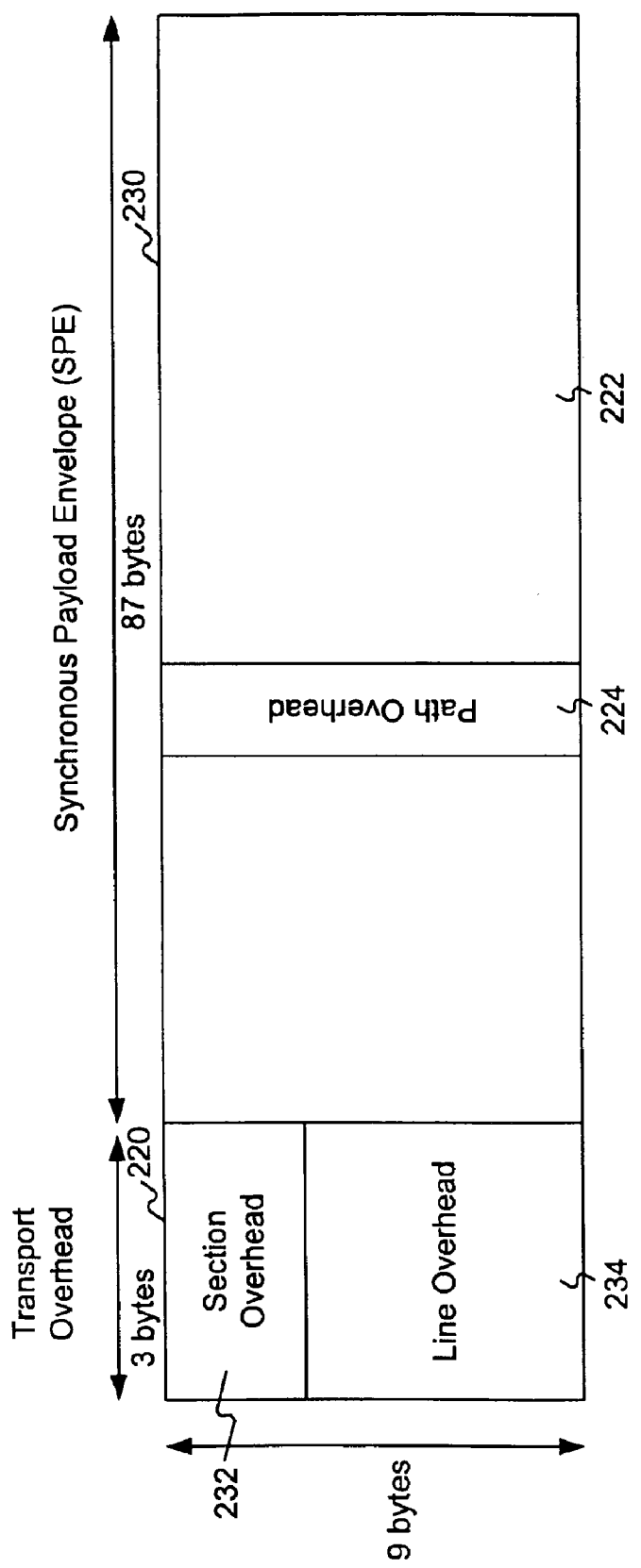
FIG. 2 is an illustration of a SONET frame.
Figure 5:
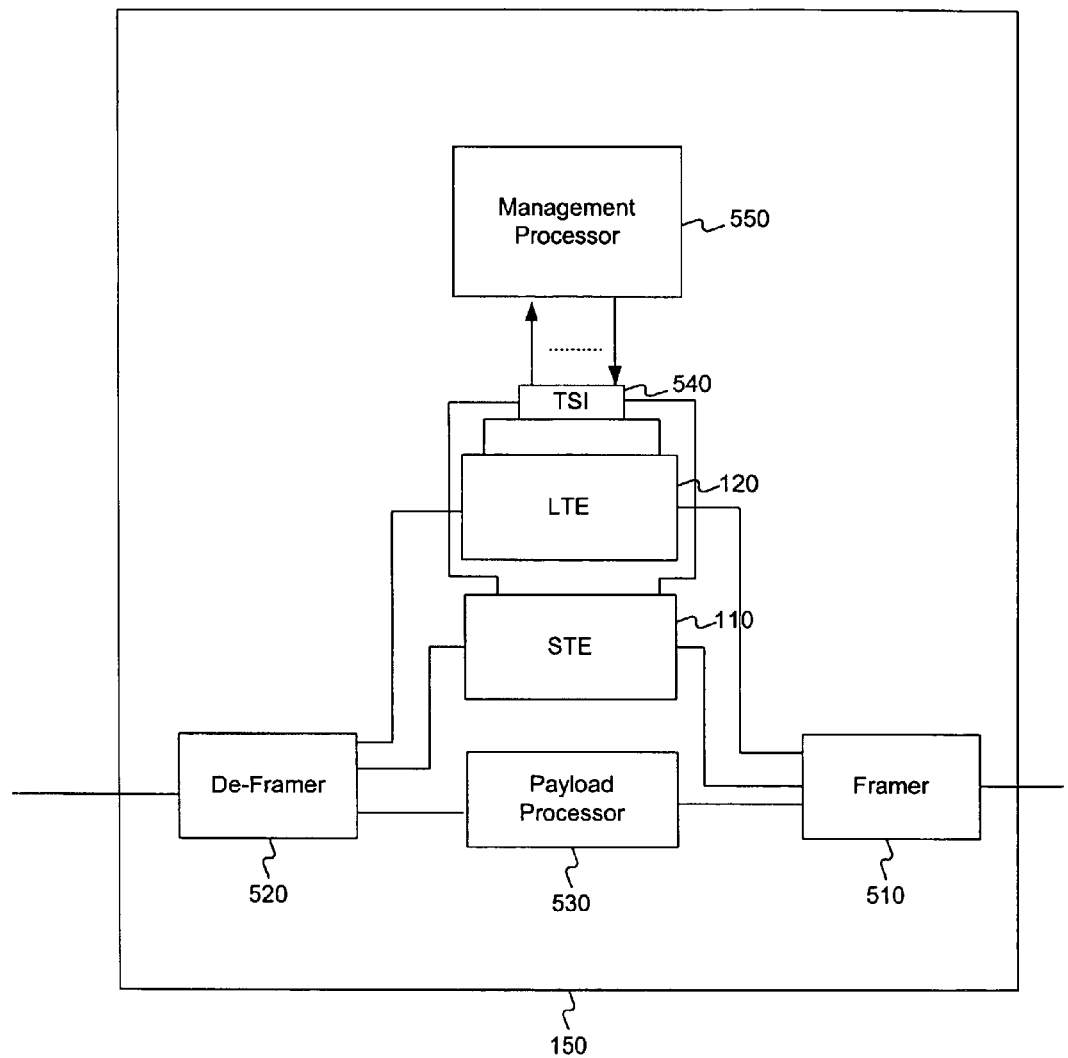
FIG. 5 is a block diagram of an add drop multiplexer, in accordance with methods and systems consistent with the invention.

FIG. 5 provides a more detailed diagram of an ADM 150, such as illustrated in FIG. 1. The functional elements of ADM 150 may include STE 110, LTE 120, a framer 510, a de-framer 520, a payload processor 530, a time slot interchange (TSI) 540, and a management processor 550.

Figure 3:
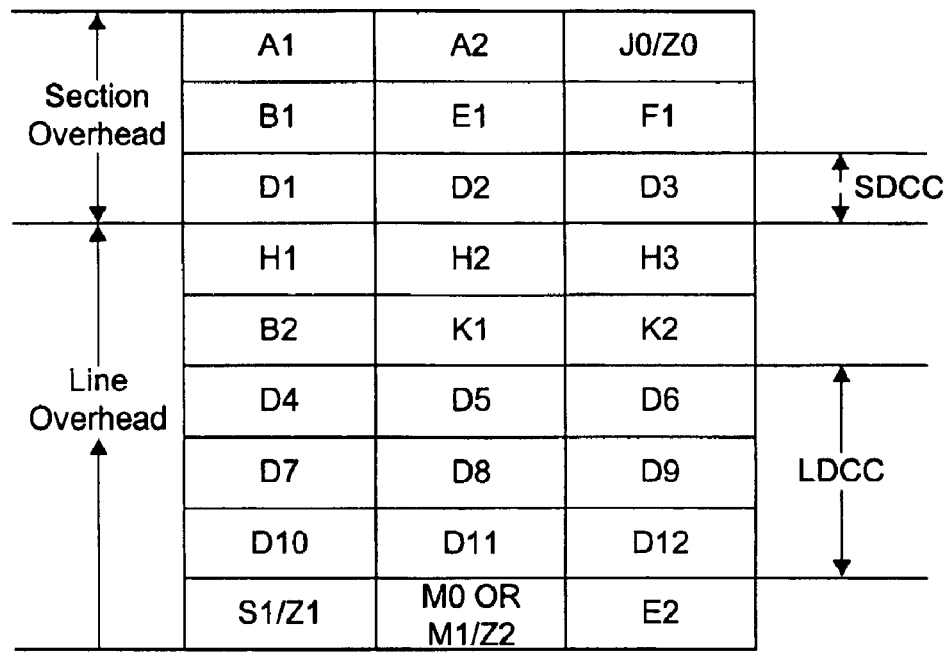
FIG. 3 is an illustration of a prior art transport overhead structure.
Figure 4:
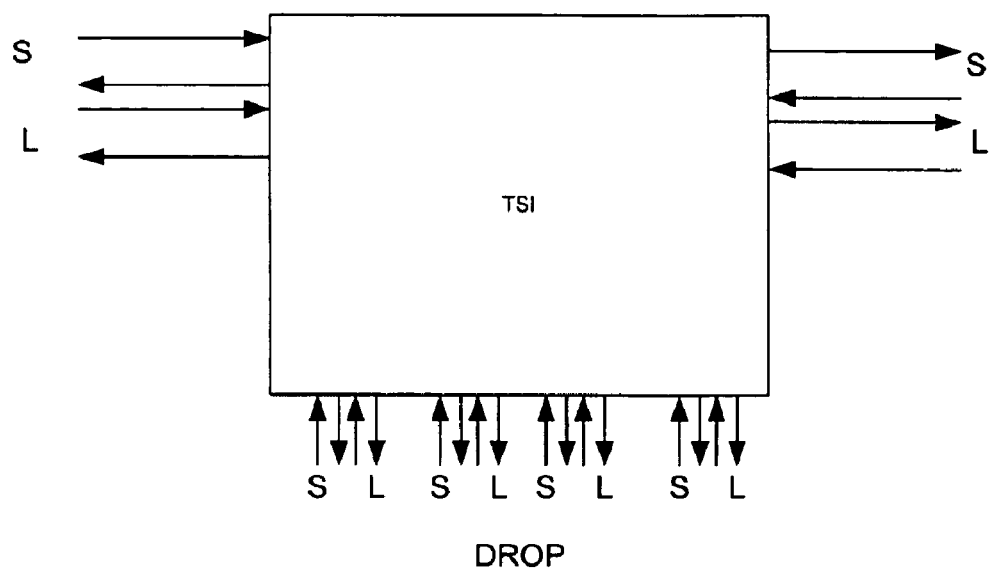
FIG. 4 is a block diagram of a prior art time slot interchange.
Figure 6:
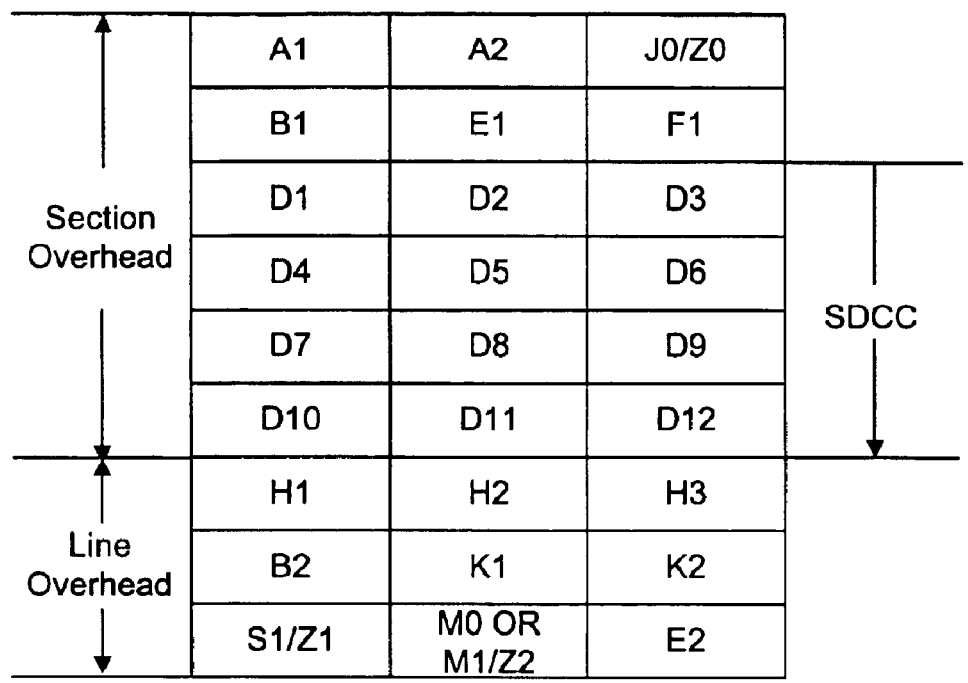
FIG. 6 is an illustration of a transport overhead structure, in accordance with methods and systems consistent with the invention.

In a preferred embodiment, the line data communications channel bytes of the transport overhead are eliminated and combined with the section data communications channel bytes, thus creating a single SDCC of 12 bytes and 768 kbps capacity. FIG. 6 illustrates a transport overhead consistent with the present invention. Data communications channel bytes D4 thru D12 are moved from the line data communications channel in the prior art transport overhead structure, which is shown in FIG. 3, into the section data communications channel to create a single data communications channel. Thus, the resulting data communications channel consists of 12 bytes and provides a 768 kbps channel.

Figure 7:
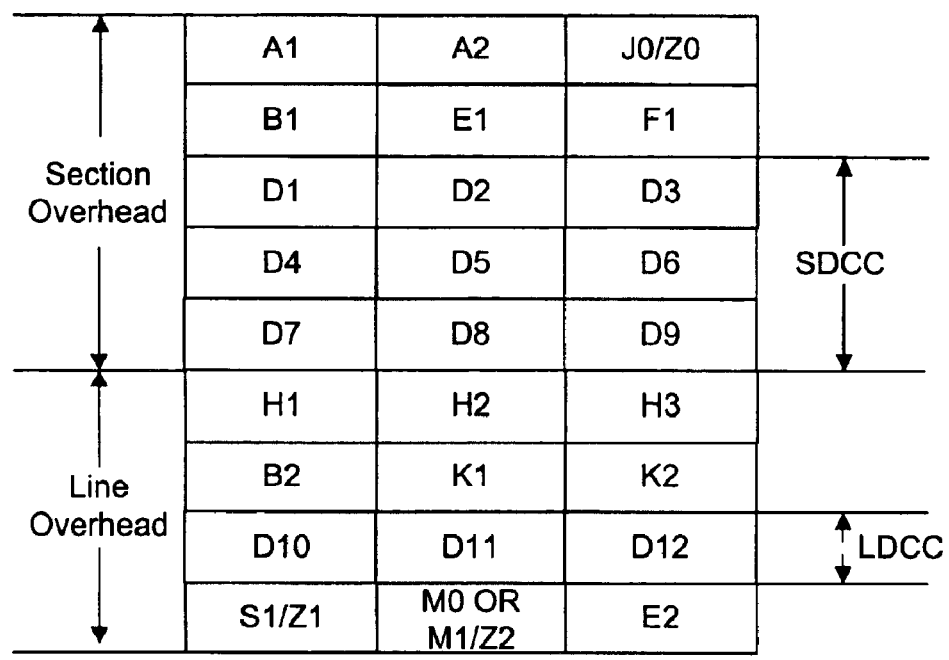
FIG. 7 is an illustration of a transport overhead structure, in accordance with methods and systems consistent with the invention.

In another embodiment, some, but not all of the LDCC bytes are combined with the SDCC bytes, as shown in FIG. 7, to create a larger SDCC. In FIG. 7, the SDCC includes DCC bytes D1–D9, while the LDCC includes DCC bytes D10–D12. This results in a SDCC with a capacity of 576 kbps and a LDCC with a capacity of 192 kbps.

Figure 8:
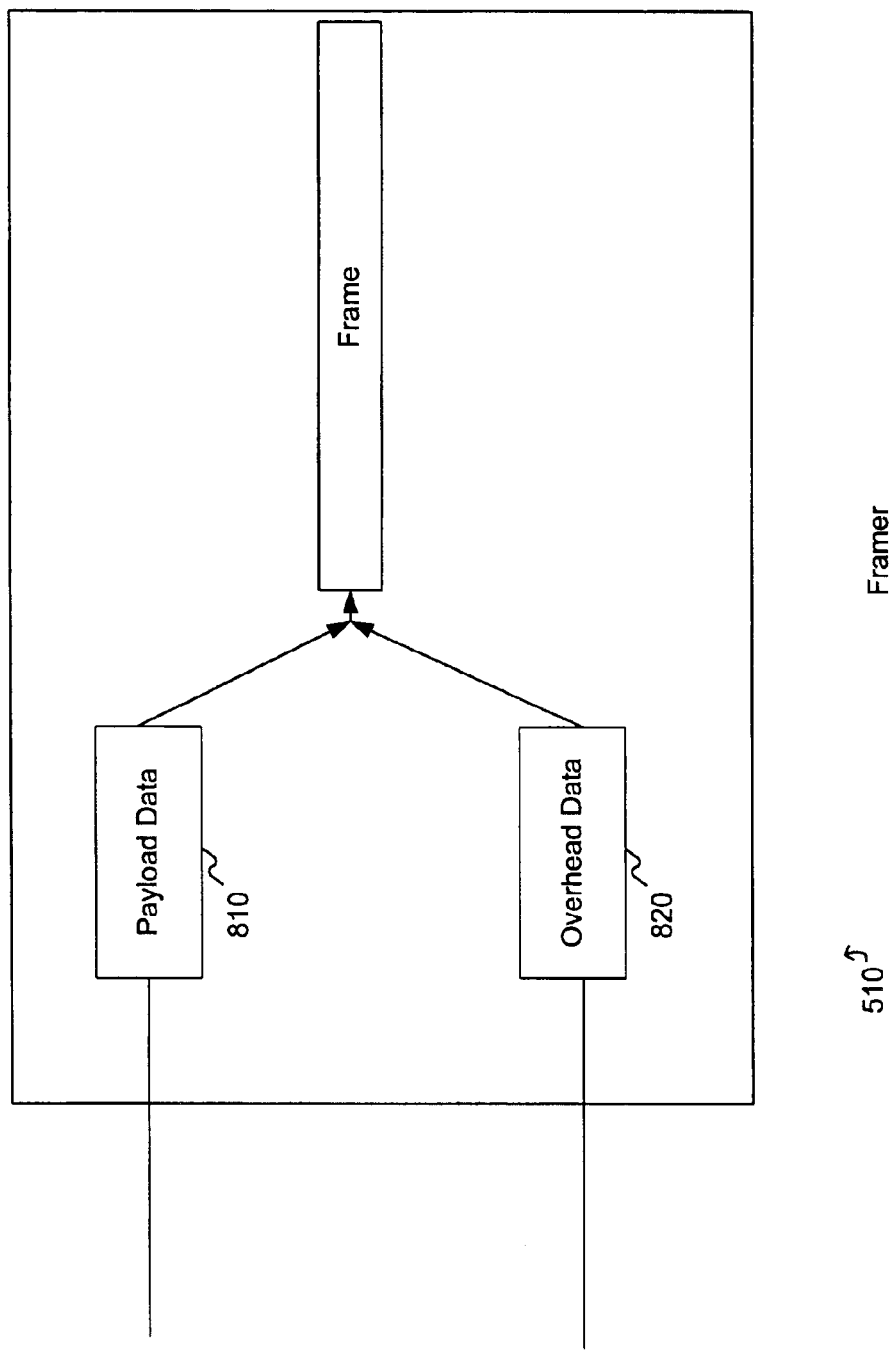
FIG. 8 is a block diagram of a framer, in accordance with methods and systems consistent with the invention.

FIG. 8 shows a block diagram of a framer 510 in accordance with an embodiment of the present invention. As shown, framer 510 includes means for inserting payload into a SONET frame 810, and a means for inserting overhead into the SONET frame 820. In general, framers are very complex and include many data mappings, dependencies on the STS-N signal rate (e.g., STS-1, STS-3, etc), and payload position variations based on pointers. However, much of this complexity has no bearing on the Data Communications Channel (DCC), and the following description of a framer of a preferred embodiment is accordingly limited.

For an STS-1 signal, a prior art SONET framing device inserts the three section DCC bytes in the standards-defined position of row 3, columns 1, 2, and 3, as illustrated in FIG. 3. Thus, the three SDCC bytes occupy three consecutive bytes whose absolute byte location within the frame are 181, 182, and 183 (where the absolute byte location is determined by consecutively numbering the bytes starting with row 1 column 1), because the first three rows of the frame are 90 bytes. As such, the first byte of the third column of the frame is byte 181 (row 1:90 bytes+row 2:90 bytes=180 bytes). Similarly, the LDCC occupies, as defined by the SONET standards, the row 6 columns 1 through 3, row 7 columns 1 through 3, and row 8 column 1 through 3, as shown in FIG. 3. In terms of absolute byte location, the LDCC thus occupies bytes 451 through 453, 541 through 543, and 631 through 633.

For an STS-N frame, the DCC bytes are defined only for the first STS-1 of the frame. As such, in frames with a rate higher than STS-1, the DCC bytes are non-consecutive because the corresponding byte positions in the STS-Ns are undefined. Thus, in an STS-3 frame, which has 270 byte rows, the D1 byte occupies the first column of row 3 as is the case with an STS-1, but D2 is in the fourth column of row 3 and D3 is in the seventh column of row 3. The intervening bytes (part of STS #2 and STS #3) between the DCC bytes, the $2^{nd}$, $3^{rd}$, $5^{th}$, $6^{th}$, $8^{th}$, and $9^{th}$ columns of row three are empty. Thus, the three section DCC byte locations are the $541^{st}$ (D1), $544^{th}$ (D2), and $547^{th}$ (D3) bytes of the frame.

Figure 9:
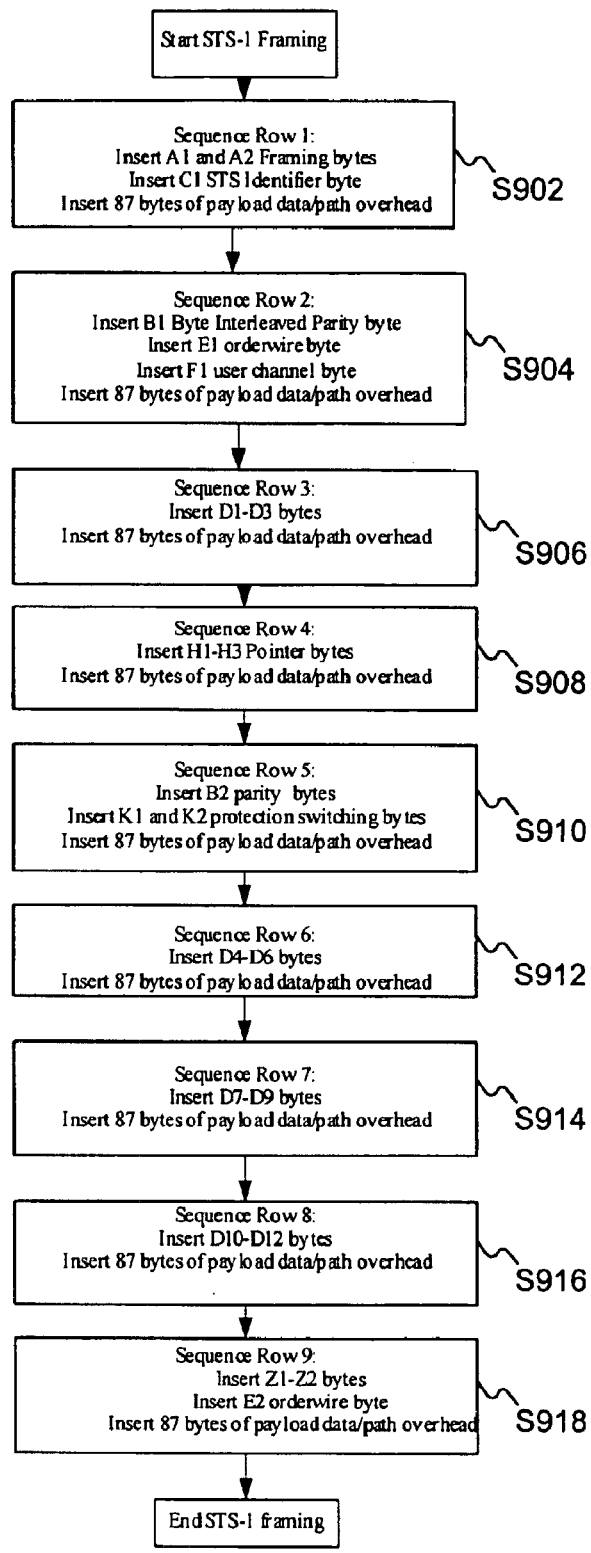
FIG. 9 is a flow diagram illustrating a process for constructing an STS-1 frame with an overhead structure consistent with the prior art SONET standards.

FIG. 9 illustrates a flow chart of an algorithm that can be used for constructing an STS-1 SONET frame according to the transport overhead structure defined by today's SONET standards, as shown in FIG. 3. As illustrated, a framer inserts bits into the frame one row at a time. First row 1 is inserted, which includes framing bytes A1 and A2, STS identifier byte C1, and 87 bytes of payload data and path overhead (S902). Then the second row is inserted, which includes bytes B1, E1, F1, and 87 bytes of payload data and path overhead (S904). The third row that includes bytes D1, D2, D3, and 87 bytes of payload data and path overhead is then inserted (S906). After which, the fourth row that includes bytes H1, H2, H3, and 87 bytes of payload data and path overhead is inserted (S908). Then, the fifth row that includes bytes B2, K1, K2, and 87 bytes of payload data and path over head is inserted (S910). The sixth row that includes bytes D4, D5, D6, and 87 bytes of payload data and path overhead is then inserted (S912). After which, the seventh row that includes bytes D7, D8, D9, and 87 bytes of payload data and path overhead is inserted (S914). Then the eighth row that includes bytes D10, D11, D12, and 87 bytes of payload data and path overhead is inserted (S916). The ninth row that includes byte Z1, Z2, E2, and 87 bytes of payload data and path overhead is then inserted (918). Thus, through this algorithm all 9 rows are inserted into the STS-1 frame.

As such, this process creates an STS-1 frame with the overhead structure of the prior art, in which SDCC bytes D1–D3 are inserted into row 3 of the frame (S906), and LDCC bytes D4–D6 are inserted into row 6 (S912), LDCC bytes D7–D9 are inserted into row 7 (S914), and LDCC bytes D10–D12 are inserted into row 8 (S916).

Figure 10:
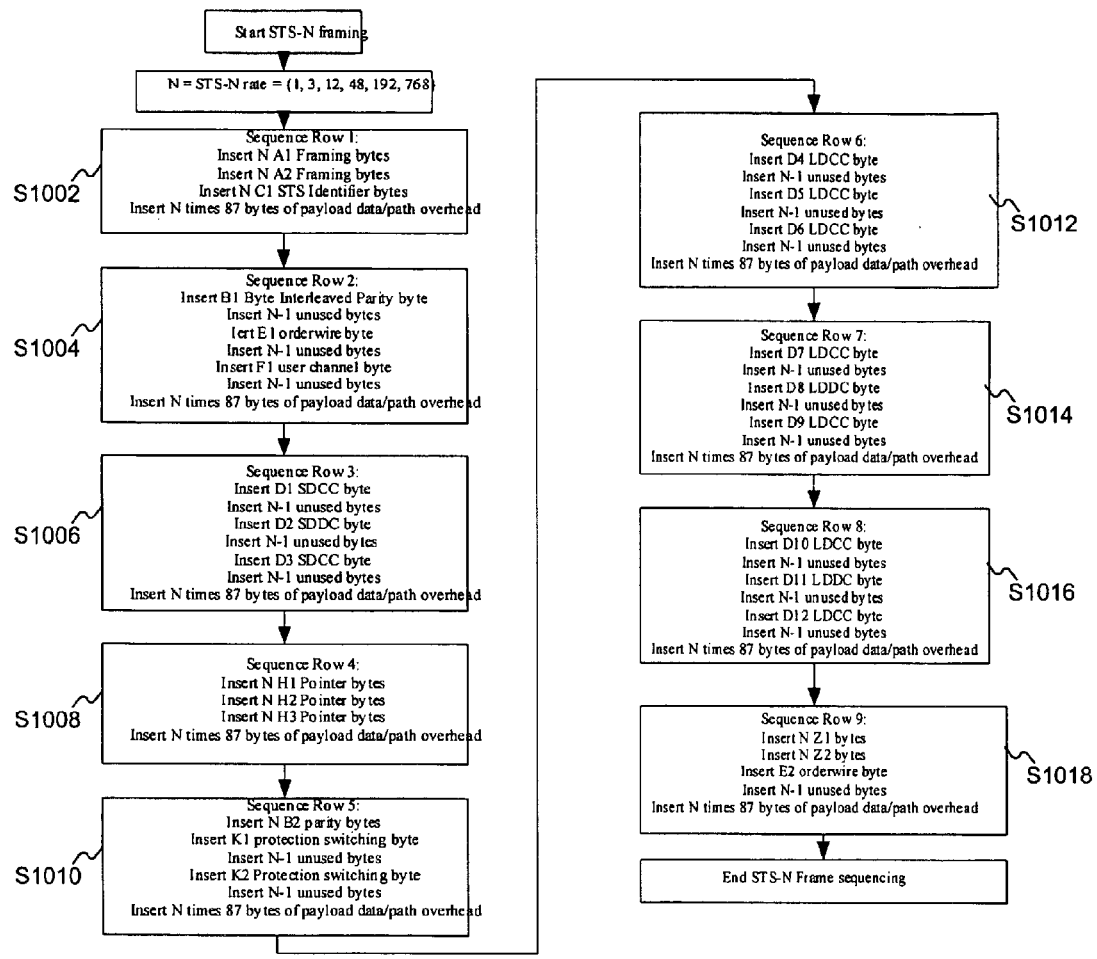
FIG. 10 is a flow diagram illustrating a process for constructing an STS-N frame with an overhead structure consistent with the prior art SONET standards.

FIG. 10 illustrates a flow chart for a process that can be used to create a STS-N frame according to the transport overhead structure defined by today's SONET standard. As illustrated, a framer inserts bits into the frame one row at a time. First, row 1 is inserted, which includes N A1 framing bytes, N A2 framing bytes, N C1 bytes, and N times 87 bytes of payload data and path overhead (S1002). Then the second row is inserted, which includes bytes B1, E1, F1, and N times 87 bytes of payload data and path overhead (S1004). The third row including bytes D1, D2, D3, and N times 87 bytes of payload data and path overhead is then inserted (S8006). After which, the fourth row, which includes N H1 bytes, N H2 bytes, N H3 bytes, and N times 87 bytes of payload data and path overhead, is inserted (S1008). Then, the fifth row, which includes N B2 bytes, the K1 byte, the K2 byte, and N times 87 bytes of payload data and path overhead, is inserted S8010). The sixth row, which includes bytes D4, D5, D6, and N times 87 bytes of payload data and path overhead, is then inserted (S1012). After which, the seventh row, which includes bytes D7, D8, D9, and N times 87 bytes of payload data and path overhead, is inserted (S1014). Then the eighth row, which includes bytes D10, D11, D112, and N times 87 bytes of payload data and path overhead, is inserted (S1016). The ninth row, which includes N Z1 bytes, N Z2 bytes, N E2 bytes, and N times 87 bytes of payload data and path overhead is then inserted (1018). Thus, through this algorithm all 9 rows are inserted into the STS-N frame. As such, the framer inserts SDCC bytes D1–D3 into row 3 of the STS-N frame (S1006), LDCC bytes D4–D6 into row 6 (S1010), LDCC bytes D7–D9 into row 7 (S1012), and LDCC bytes D10–D12 into row 8 (S1014).

As previously indicated, the SONET frame of a preferred embodiment has an increased capacity SDCC. From a framing algorithm perspective, there are no changes in the total number of bytes, rows, or columns that make up the frame, nor is the total number of DCC bytes altered. This means that the changes to the framing algorithm, preferably, include re-ordering of the rows without changing how each row is sequenced. The changes also have no impact on the STS-N interleaving dependency either, i.e., the "N-1" and "N times 87" factors are unchanged.

In a preferred embodiment, all nine LDCC bytes are moved to the SDCC, totally eliminating the LDCC. In the resulting DCC shown in FIG. 6, the twelve DCC bytes are placed in the first three columns of four consecutive rows beginning with row 3, the original starting row for the SDCC.

In accordance with an embodiment of the invention, the corresponding byte positions are as follows for an STS-1 frame:

| | |
|---|---|
| D1–D3 | Bytes 181–183 |
| D4–D6 | Bytes 271–273 |
| D7–D9 | Bytes 361–363 |
| D10–D12 | Bytes 451–453 |

In this embodiment, overhead rows 4 and 5 of the frame structure containing the pointer, parity, a nd protection switching overhead bytes (H1–3, B2, K1–3) are repositioned intact to rows 7 and 8. Total line overhead is thus reduced from 6 rows by 3 columns or 18 bytes to 3 rows by 3 columns or 9 bytes. The total number of section and line overhead bytes is not changed and remains at 27 (9 rows by 3 columns). The number of section overhead bytes is increased from 9 bytes to a total of 18 bytes.

Figure 11:
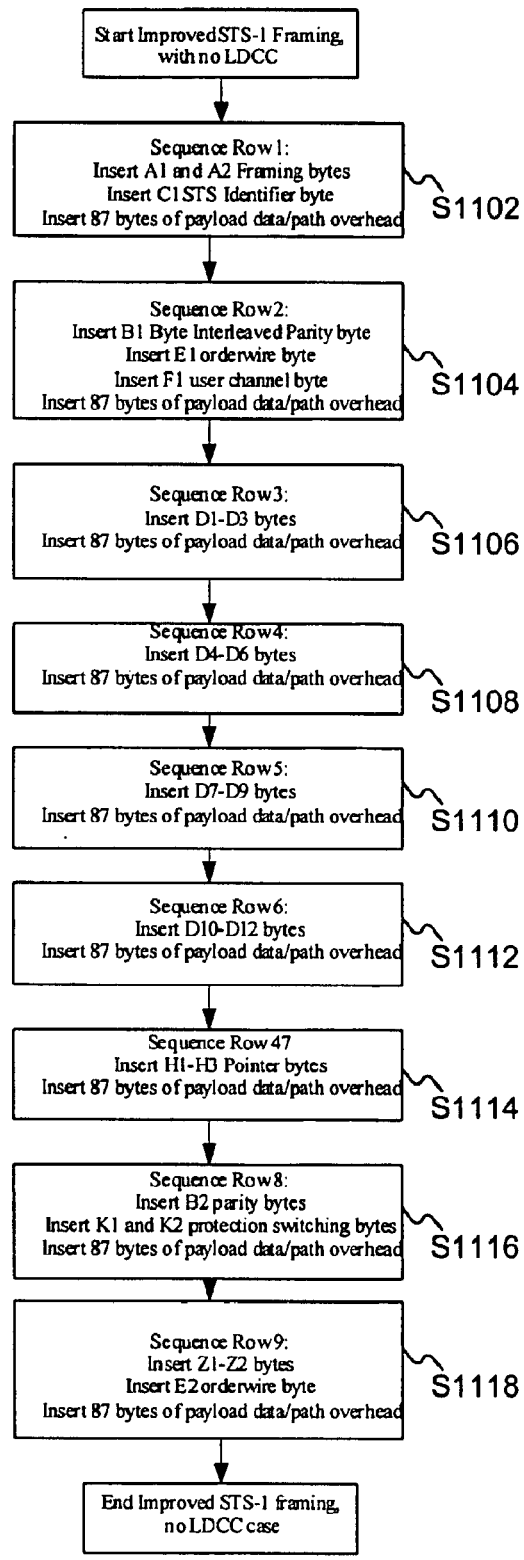
FIG. 11 is a flow diagram illustrating a process for constructing an STS-1 frame with an overhead structure in which the LDCC bytes are eliminated, in accordance with systems and methods consistent with the invention.

FIG. 11 illustrates a flow chart of an algorithm that can be used for constructing an STS-1 frame according to a transport overhead in which all the LDCC bytes are eliminated and combined with the SDCC bytes to create a single DCC. As illustrated, a framer of this embodiment inserts bits into the frame one row at a time. First row 1 is inserted, which includes framing bytes A1 and A2, STS identifier byte C1, and 87 bytes of payload data and path overhead (S1102). Then the second row is inserted, which includes bytes B1, E1, F1, and 87 bytes of payload data and path overhead (S1104). The third row that includes bytes D1, D2, D3, and 87 bytes of payload data and path overhead is then inserted (S1106). The fourth row that includes bytes D4, D5, D6, and 87 bytes of payload data and path overhead is then inserted (S1108). After which, the fifth row that includes bytes D7, D8, D9, and 87 bytes of payload data and path overhead is inserted (S1110). Then the sixth row that includes bytes D10, D11, D12, and 87 bytes of payload data and path overhead is inserted (S1112). After which, the seventh row that includes bytes H1, H2, H3, and 87 bytes of payload data and path overhead is inserted (S1114). Then, the eighth row that includes bytes B2, K1, K2, and 87 bytes of payload data and path over head is inserted (S1116). The ninth row that includes byte Z1, Z2, E2, and 87 bytes of payload data and path overhead is then inserted (S1118). Thus, through this algorithm all 9 rows are inserted into the STS-1 frame.

As such, DCC bytes D1–D3 are inserted into row 3 of the frame (S1106), D4–D6 are inserted into row 4 (S1108), D7–D9 are inserted into row 5 (S1110), and D10–D12 are inserted into row 6 (S1112).

As compared to the above described standardized algorithm for creating an STS-1 frame illustrated in FIG. 9, this algorithm has the following five differences:

1. DCC bytes D4–D6 are inserted in row 4 columns 1–3 instead of row 6 columns 1–3.
2. DCC bytes D7–D9 are inserted in row 5 columns 1–3 instead of row 7 columns 1–3.
3. DCC bytes D10–D12 are inserted in row 6 column 1–3 instead of row 8 columns 1–3.
4. Pointer Bytes H1–H3 are inserted in row 7 column 1–3 instead of row 4 column 1–3.
5. The B2, K1, and K2 overhead bytes are inserted in row 8 column 1–3 instead of row 5 column 1–3.

A network element of a preferred embodiment may use the above described transport overhead structure to create a frame with a DCC but no LDCC.

In another embodiment, the capacity of the SDCC is increased at the expense of the LDCC, without totally eliminating the LDCC, because it may be desirable to retain a small amount of LDCC capability while shifting the bulk of the LDCC capacity to SDCC.

Figure 12:
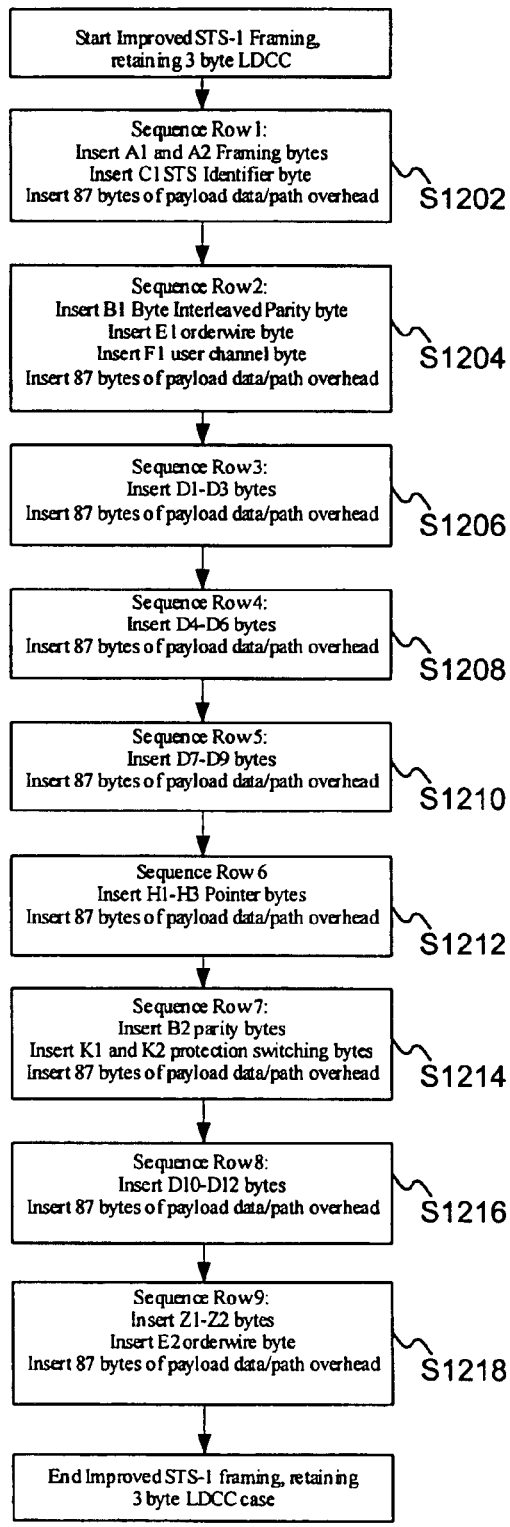
FIG. 12 is a flow diagram illustrating a process for constructing an STS-1 frame with an overhead structure in which the SDCC is larger than the LDCC, in accordance with systems and methods consistent with the invention.

FIG. 12 illustrates a flow diagram of an algorithm for constructing a frame in which the SDCC capacity is tripled by moving six of the nine LDCC bytes to the SDCC. As illustrated, a framer inserts bits into the frame one row at a time. First, row 1 is inserted, which includes bytes A1, A2, C1, and 87 bytes of payload data and path overhead (S1202). Then the second row is inserted, which includes bytes B1, E1, F1, and 87 bytes of payload data and path overhead (S1204). The third row including bytes D1, D2, D3, and 87 bytes of payload data and path overhead is then inserted (S1206). The fourth row, which includes bytes D4, D5, D6, and 87 bytes of payload data and path overhead, is then inserted (S1208). After which, the fifth row, which includes bytes D7, D8, D9, and 87 bytes of payload data and path overhead is inserted (S1210). After which, the sixth row, which includes bytes H1, H2, H3, and 87 bytes of payload data and path overhead is inserted (S1212). Then, the seventh row, which includes bytes B2, K1, K2, and 87 bytes of payload data and path overhead, is inserted (S11214). Then the eighth row, which includes bytes D10, D11, D12, and 87 bytes of payload data and path overhead, is inserted (S1216). The ninth row that includes bytes Z1, Z2, E2, and 87 bytes of payload data and path overhead is then inserted (S1218). Thus, through this algorithm all 9 rows are inserted into the STS-1 frame.

As such, D10–D12 are the retained LDCC bytes and are inserted into row 8 (S1216). Further, in this example, DCC bytes D1–D3 are inserted into row 3 (S1206), D4–D6 are inserted into row 4 (S1208), and D7–D9 are inserted into row 5 (S1210). As such, D4–D9 become the additional SDCC bytes.

The above description of the framer is but one possible implementation of a framer consistent with the invention. Those skilled in the art will understand that various changes and modifications may be made, and equivalents may be substituted for the above described preferred embodiments of the framer without departing from the true scope of the invention.

Furthermore, a network element of a preferred embodiment may use the above described tranport overhead structure to create a frame with more SDCC bytes than LDCC bytes.

Figure 13:
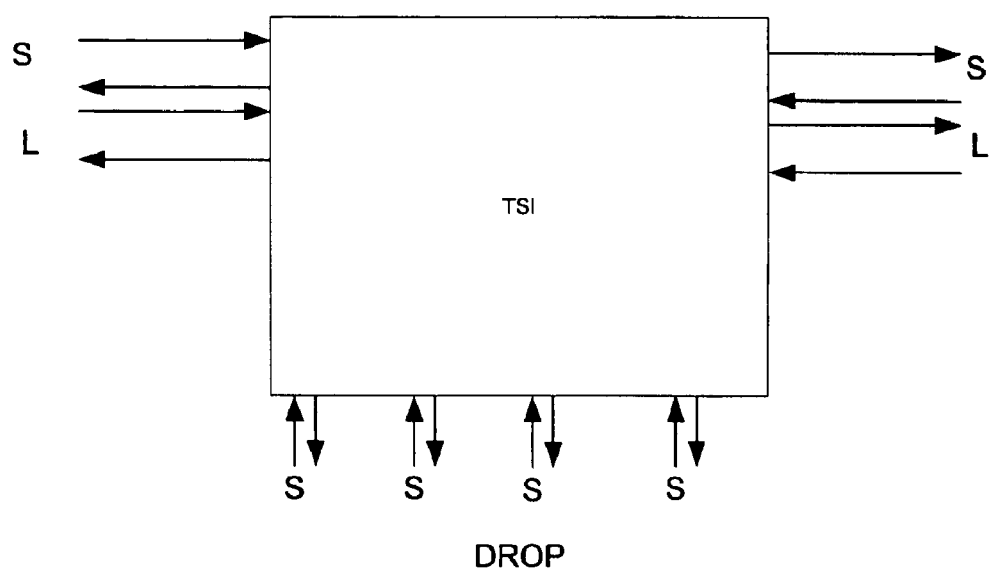
FIG. 13 is a block diagram of a time slot interchange, in accordance with methods and systems consistent with the invention.

FIG. 13 illustrates a TSI 1300, for use in a network implementing a SONET frame comprising an SDCC, but no LDCC, in accordance with an embodiment of the invention. The TSI 1300 comprises only S drop channels. Because there is no LDCC, only a single pair of inbound and outbound SDCC point to point links must be terminated at each interface. Further, as will be obvious to one skilled in the art, the same above-described principals and possible improvements described for the TSI are equally applicable to any device that selectively, under software control, allows input data slices to be transferred to output ports, while maintaining the integrity and timing of the data.

Figure 14:
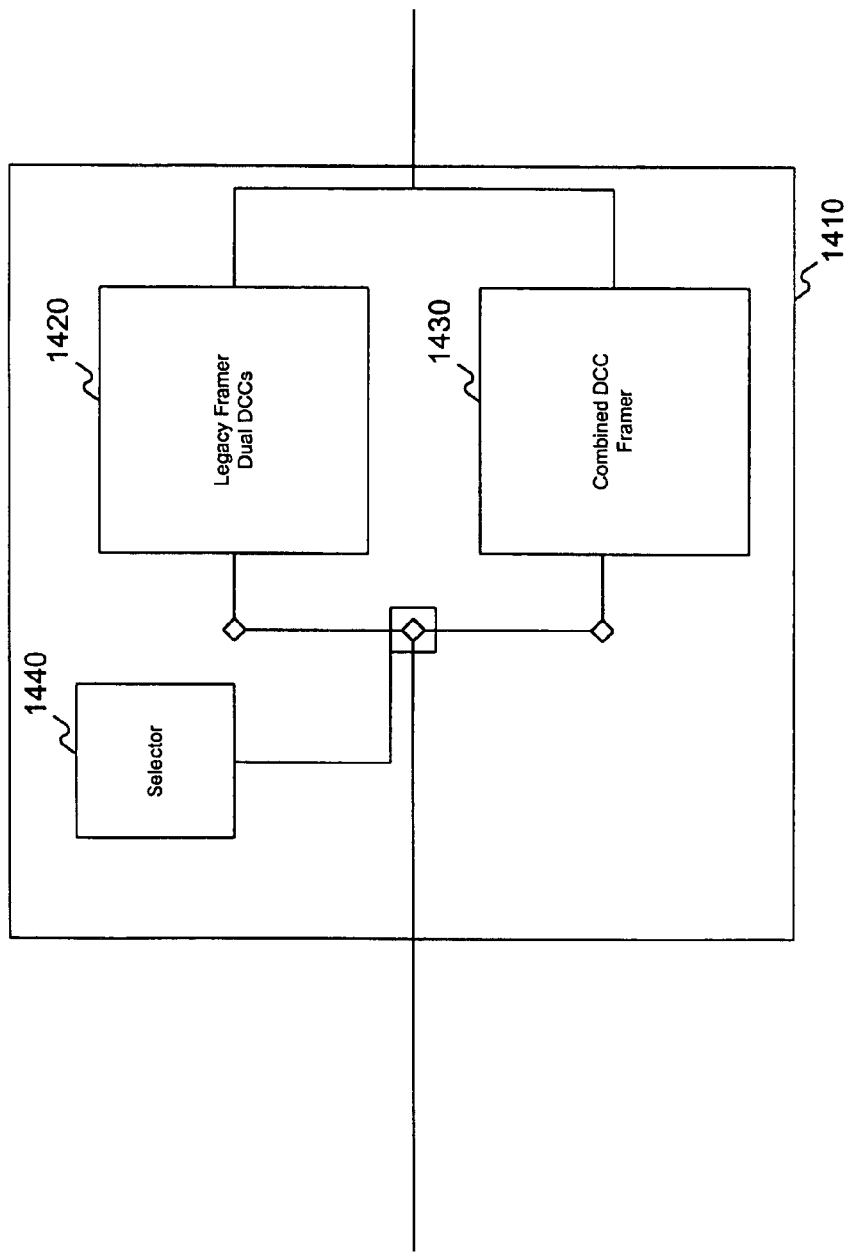
FIG. 14 is a block diagram of a dual mode adapter, in accordance with methods and systems consistent with the invention.

FIG. 14 illustrates a dual-mode adapter 1410 for use in a network implementing both a frame of a preferred embodiment of the invention and a frame with the existing SONET overhead structure, in accordance with an embodiment of the invention. This dual-mode adapter 1410 includes both a legacy framer 1420 and a combined DCC framer 1430 in addition to a selector 1440. The legacy framer 1420 constructs frames with the overhead structure of the prior art, while the combined DCC framer 1430 constructs frames with an increased capacity SDCC channel. The selector 1440 selects whether to use the legacy framer 1420 or the combined DCC framer 1430.

A network according to a preferred embodiment may include STEs and LTEs. In this embodiment, the STEs and LTEs include a framer 800 as shown in FIG. 8. This framer 800, like the framers described above, creates a frame with more SDCC bytes than LDCC bytes. In one aspect of this embodiment, all the LDCC bytes in the transport overhead of the prior art are eliminated and added to the SDCC bytes to create a transport overhead structure such as is shown in FIG. 6. In another aspect, only some of the LDCC bytes are eliminated and combined with the SDCC bytes, thus creating an increased capacity SDCC, such as is shown in FIG. 7.

Referring back to FIG. 5, the de-framer 520 may include means for extracting payload bits from the frame and means for extracting overhead bits from the frame. The means for extracting payload bits and the means for extracting overhead bits may be implemented using software or hardware, such as application specific integrated circuit (ASIC). As will be obvious to one of skill in the art in light of the above described description, in one embodiment, the de-framer 520 may operate to extract SDCC bytes from a frame in which there is no LDCC. As such, in this embodiment, the de-framer 520 would not extract LDCC bytes.

While it has been illustrated and described what is at present considered to be the preferred embodiment and methods of the present invention, it will be understood by those skilled in the art that various changes and modifications may be made, and equivalents may be substituted for elements thereof without departing from the true scope of the invention.

In addition, many modifications may be made to adapt a particular element, technique or, implementation to the teachings of the present invention without departing from the central scope of the invention. Therefore, it is intended that this invention not be limited to the particular embodiment and methods disclosed herein, but that the invention includes all embodiments falling within the scope of the appended claims.

What is claimed is:

1. A dual mode adapter, comprising:

a first means for inserting into a frame a plurality of data communications channel bits, wherein the number of data communications channel bits inserted into a section overhead is greater than the number of data communications channel bits inserted into a line overhead, a second means for inserting into a frame a plurality of data communications channel bits, wherein the number of data communications channel bits inserted into a line overhead is greater than the number of data communications channel bits inserted into a section overhead;

means for selecting between the first and second means.

2. The dual mode adapter of claim 1 wherein the frames are SONET frames.

3. The dual mode adapter of claim 1 wherein the frames are SDH frame.

4. The dual mode adapter of claim 1 wherein the number of data communications channel bits inserted into the line overhead by the first means is zero.

* * * * *